United States Patent
Zhang et al.

(10) Patent No.: US 7,420,760 B2
(45) Date of Patent: Sep. 2, 2008

(54) METHOD AND APPARATUS REDUCING FLYING HEIGHT DROP IN A HARD DISK DRIVE UNDER HUMID CONDITIONS

(75) Inventors: Shuyu Zhang, Fremont, CA (US); Brian D. Strom, Cupertino, CA (US); SungChang Lee, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/586,881

(22) Filed: Oct. 25, 2006

(65) Prior Publication Data

US 2007/0297085 A1   Dec. 27, 2007

Related U.S. Application Data

(60) Provisional application No. 60/816,162, filed on Jun. 23, 2006.

(51) Int. Cl.
G11B 21/02 (2006.01)

(52) U.S. Cl. ......................................................... 360/75

(58) Field of Classification Search .................. 360/69, 360/70, 75, 31, 66, 313, 236.5, 235.7, 234, 360/128; 374/7; 369/14
See application file for complete search history.

(56) References Cited

U.S. PATENT DOCUMENTS

| | | | | |
|---|---|---|---|---|
| 5,810,477 A * | 9/1998 | Abraham et al. | ................. | 374/7 |
| 5,850,374 A * | 12/1998 | Abraham et al. | ................. | 369/14 |
| 6,019,503 A * | 2/2000 | Abraham et al. | ................. | 374/4 |
| 6,603,628 B1 * | 8/2003 | Gillis et al. | ..................... | 360/75 |
| 6,801,376 B2 * | 10/2004 | Smith | ........................... | 360/31 |
| 6,958,875 B2 * | 10/2005 | Yun et al. | ....................... | 360/66 |
| 7,009,813 B2 * | 3/2006 | Kang et al. | ............... | 360/235.7 |
| 7,064,930 B2 * | 6/2006 | Serpe et al. | ............... | 360/236.5 |
| 7,256,965 B2 * | 8/2007 | Rao et al. | ................. | 360/235.7 |
| 2004/0264049 A1 * | 12/2004 | Brown et al. | ................. | 360/234 |
| 2006/0077591 A1 * | 4/2006 | Kurihara et al. | ............. | 360/128 |
| 2006/0268464 A1 * | 11/2006 | Yang | .......................... | 360/313 |
| 2007/0230014 A1 * | 10/2007 | Yamashita et al. | ............ | 360/75 |
| 2007/0230015 A1 * | 10/2007 | Yamashita et al. | ............ | 360/75 |

OTHER PUBLICATIONS

"Effects of Humid Air on Air Bearing Flying Height" by Strom et al., manuscript submitted Apr. 2, 2006 for unknown conference session. Publication status unknown.
Product data sheet "SHT1x/SHT7x Humidity and Temperature Sensor", v. 2.04 May 2005, Sensirion AG, Laubisrutistr. 50, CH-8712 ZH, Switzerland.

* cited by examiner

*Primary Examiner*—Fred Tzeng
(74) *Attorney, Agent, or Firm*—Earle Jennings; GSS Law Group

(57) ABSTRACT

A slider with an intake heater near front edge heating air passing between air bearing surface and rotating disk surface to reduce change in flying height caused by water condensation. Method of operating the slider. Head gimbals assembly including slider. Head stack assembly including at least one HGA. Operating hard disk drive by receiving temperature and humidity reading to determine heater control and asserting heater control to stimulate intake heater to heat air. Embedded processor directing hard disk drive at least partly implementing operations. Embedded circuit including embedded processor. A hard disk drive including temperature, humidity sensors, embedded circuit and head stack assembly. Manufacturing methods for slider, head gimbals assembly, head stack assembly, embedded processor, embedded circuit and hard disk drive, and these items as products of their manufacturing processes.

32 Claims, 14 Drawing Sheets

METHOD AND APPARATUS REDUCING FLYING HEIGHT DROP IN A HARD DISK DRIVE UNDER HUMID CONDITIONS

CROSS REFERENCE TO RELATED APPLICATIONS

This patent application claims priority to U.S. Provisional Patent Application No. 60/816,162 filed Jun. 23, 2006, which is incorporated herein by reference.

TECHNICAL FIELD

This invention relates to slides in hard disk drives, in particular to methods and mechanisms for heating the air flowing between sliders and the disk surfaces they access to reduce the drop in flying height which occurs in humid conditions.

BACKGROUND OF THE INVENTION

Contemporary hard disk drives employ a voice coil motor pivoting about an actuator pivot to position one or more sliders over rotating disk surfaces. Each slider is supported a very short distance above its rotating disk surface by an air bearing formed by the flow of air through the gap between the air bearing surface of the slider and the disk surface. The slider is positioned at a pitch angle to disk surface, with the trailing edge being closest to it and the front edge furthest. Near the trailing edge, the read-write head operate to access the data typically stored in a track on the disk surface. Recently the inventors discovered that the flying height drops significantly in humid conditions, as disclosed in U.S. Provisional Patent Application No. 60/816,162 referenced above.

What is needed is a way to minimize this the drop in flying height due to water condensation.

SUMMARY OF THE INVENTION

One way to reduce the air bearing pressure drop and the corresponding drop in flying height is to increase the water vapor saturation pressure by increasing the temperature of the air flowing between a slider's air bearing surface and the rotating disk surface it accesses. Embodiments of the invention's slider may preferably include an intake heater positioned near the front edge. Alternatively, embodiments of the slider may include a means for heating the air flowing between the air bearing surface and the rotating disk surface, which may further preferably include the intake heater. The intake heater preferably provides heat to the air bearing formed between the air bearing surface and the rotating disk surface as shown in FIG. 1C, in particular, when electrically stimulated by a heating control signal. FIG. 1A shows the change in flying height due to the increase in temperature.

The slider may further preferably include the intake heater and a thermal insulator, which acts to direct the heat generated by the intake heater away from the surrounding environment and toward the intake as shown in FIGS. 1B and 1C.

The air bearing surface may further include a variety of features as shown in FIGS. 2A, 2B, 12B and 12C. Most notably, the air bearing surface may include pads with diamond like carbon (PDLC) for use in Contact Start-Stop hard disk drives which park their sliders on disk surfaces and may not include pads PDLC for use in hard disk drives which uses ramps to park their sliders off the disk surfaces.

The slider may include a vertical micro-actuator employing any one or more of a piezoelectric effect, a thermo-mechanical effect and/or an electrostatic effect to further alter the flying height, as shown in FIGS. 5A, 7A, 7B, and 9.

Manufacturing the slider may preferably include forming the intake heater near the front edge of the slider to create the slider and preferably forming the intake heater with the thermal insulator also near the front edge. The slider is a product of this manufacturing process.

Alternatively, manufacturing the slider may include forming the means for heating the air to create the slider. As before, the slider is a product of this manufacturing process. Manufacturing the slider may further include forming the means for heating may further include forming a thermal insulator near the front end. Forming the means for heating may further include forming the intake heater near the front edge.

The invention's head gimbal assembly preferably includes an embodiment of the invention's slider coupling through a flexure finger to a load beam. The head gimbal assembly may preferably include a micro-actuator assembly, which alters at least the lateral position of the slider and its read-write head over a track on the rotating disk surface. The micro-actuator may employ a piezoelectric effect and/or a thermo-mechanical effect and/or an electrostatic effect.

Manufacturing the head gimbal assembly preferably includes coupling the slider through the flexure finger to the load beam to create the head gimbal assembly as a product of this manufacturing process.

The invention's head stack assembly including at least one of head gimbal assembly coupled to a head stack. The head stack assembly may include more than one head gimbal assembly coupled to the head stack. Manufacturing the head stack assembly includes coupling the head gimbal assemblies to the head stack to create the head stack assembly as a product of this manufacturing process, often preferably done by swaging the base plates of the head gimbal assemblies to the actuator arms of the head stack. An actuator arm may be thus coupled to one or two head gimbal assemblies.

The hard disk drive preferably includes both a temperature sensor and a humidity sensor, which sensor-couple to an embedded circuit and further preferably sensor-couples to an embedded processor. The embedded circuit, and preferably the embedded processor, directs the hard disk drive to operate by receiving a temperature reading from the temperature sensor and a humidity reading from the humidity sensor. A heater control signal is determined based upon the temperature reading and the humidity reading, which is then asserted to stimulate the intake heater on the slider to increase the air temperature between the air bearing surface and the rotating disk surface.

The embedded processor may preferably include at least one instance of a controller. As used herein each controller receives at least one input, maintains at least one state and generates at least one output.

At least one of the states includes at least one of a non-redundant digital representation, a redundant digital representation and/or an analog representation. A non-redundant digital representation frequently comprises at least one digit, which may frequently represent a bit with values of 0 and 1, a byte including eight bits, and so on. A redundant digital representation of a non-redundant digital representation may include a numerically redundant digital representation, an error control representation and/or a logically redundant representation. The following examples will serve to illustrate these non-redundant representations:

An example of a numerically redundant representation may be found in a standard multiplier, which will often use a local carry propagate adder to add three or four numbers together to generate two numeric components which redundant represent the numeric result of the addition.

An example of an error control representation will frequently use the non-redundant digital representation and an additional component formed as the function of the non-redundant digital representation. If this error control representation is altered by a few number of bits, a error correcting function reconstructs the original non-redundant digital representation. Quantum computers are considered as controllers which will tend to use this kind of error control representations for at least some states.

An example of a logically redundant representation may be found in the definition and implementation of many finite state machines, which often require that a single state be represented by any member of a multi-element set of non-redundant digital representations. Often the members of this set differ from at least one other member of the set by just one bit. Use of such logically redundant representations insure that the generation of glitches is minimized.

The controllers may each include at least one instance of at least one of the following: A computer directed by a program system and accessibly coupled to via a buss a memory, wherein the program system includes at least one program step residing in the memory. Where the computer includes at least one data processor and at least one instruction processor, and each data processor is directed by at least one of the instruction processors. A finite state machine. An inferential engine. And a neural network.

Embodiments of the embedded processor may implement this method of operation by including means for receiving the temperature reading from the temperature sensor and the humidity reading from the humidity sensor and means for determining the heater control signal based upon the temperature reading and the humidity reading.

The hard disk drive may include the means for asserting the heater control signal to stimulate the intake heater on the slider to increase the air temperature between the air bearing surface and the rotating disk surface. Alternatively, the embedded circuit and further, the embedded processor may include the means for asserting.

The means group consisting of the means for receiving 700, the means for determining 702 and the means for asserting 704 may be implemented using at least one instance of at least one of the following: A computer accessibly coupled a memory and directed by a program system including at least one program step residing in the memory. As used herein, a computer will include at least one instruction processor and at least one data processor, wherein each of the data processors is directed by at least one instruction processor. A finite state machine. An inference engine. And a neural network.

Manufacturing the embedded circuit may include providing the means for receiving and the means for determining to create the embedded circuit, which may preferably include programming a non-volatile memory component of the memory accessibly coupled to the computer. The embedded circuit is a product of this manufacturing process.

Manufacturing the hard disk drive may include coupling the temperature sensor and the humidity sensor to the embedded circuit to provide the temperature reading and the humidity reading, and couple the embedded circuit to the head stack assembly to provide the heating control to stimulate the intake heater of the slider, thereby creating the hard disk drive. The hard disk drive is a product of this process.

BRIEF DESCRIPTION OF THE DRAWINGS

FIGS. 6 to 8A, 8I and 9 show further aspects of the hard disk drive employing embodiments of the invention's head stack assembly, head gimbal assembly and slider;

FIGS. 10A to 11A show some details of the program system of FIG. 9;

DETAILED DESCRIPTION

This invention relates to slides in hard disk drives, in particular to methods and mechanisms for heating the air flowing between sliders and the disk surfaces they access to reduce the drop in flying height which occurs in humid conditions.

One way to reduce the air bearing pressure drop and the corresponding drop in flying height is to increase the water vapor saturation pressure by increasing the temperature of the air flowing between a slider's air bearing surface 92 and the rotating disk surface 120 it accesses. An embodiment of the invention's slider includes an intake heater 90H positioned near the front edge FE of the air bearing surface of the slider 90, as shown in FIGS. 1B to 3A, 5A, 12B and 12C. The intake heater provides heat to the air bearing formed between air bearing surface and the rotating disk surface as shown in FIG. 1C, in particular, when electrically stimulated by a heating control Htrctl as shown in FIGS. 7A to 9.

Figure 1A:
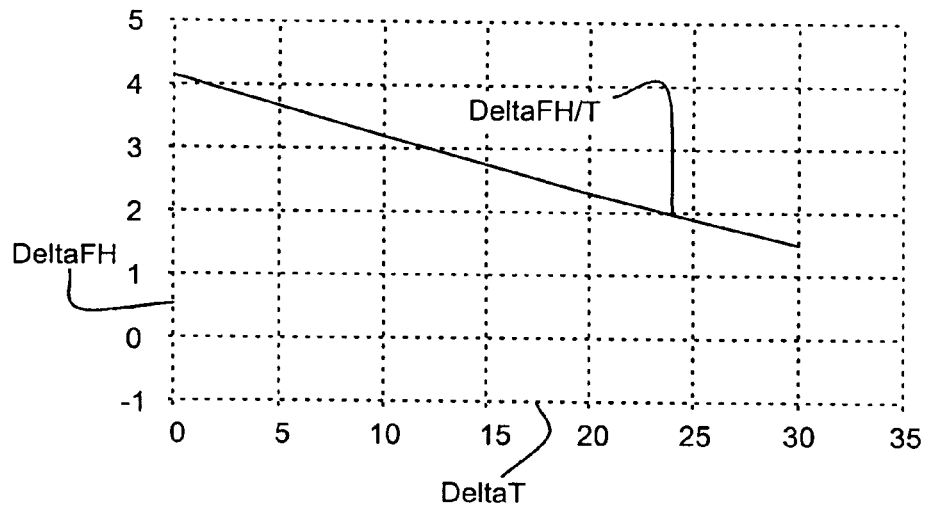
FIG. 1A shows the relationship between heating the air flowing between embodiments of the slider and the rotating disk surface and the change in flying height that results.

The intake heater 90H alters the saturation water pressure in the air bearing between said air bearing surface 92 and said rotating disk surface 120 to reduce the change in flying height DeltaFH versus the change in air temperature DeltaT as shown in FIG. 1A. The relationship of the change in air bearing temperature represented by the horizontal axis (DeltaT) and the change in flying height shown as the vertical axis (DeltaFH) is summarized by the trace labeled DeltaFH/T. The units of the horizontal axis are in degrees Centigrade and the units of the vertical axis are in nanometers. The ambient conditions in this experiment were 60° C. and 70% relative humidity. With no air bearing temperature increase, the flying height FH suffers a change in flying height DeltaFH of 2.5 nanometers (nm) below the flying height under dry air conditions, whereas with an air bearing temperature change DeltaT of 30° C., the change in flying height is 1.25 nm, roughly a fifty percent improvement.

By way of example, consider how much power is required to heat the air bearing by 30° C. Assume that the front height h of the intake between the front edge FE and the rotating disk surface 120 is about 0.5 micrometer (μm) and the intake length L of the air bearing is about 1 millimeter (mm). The air speed u is will be assumed to be 20 meters/sec, which is compatible with a 3.5 inch hard disk drive 10 rotating its disk 12 at 7200 Revolutions Per Minute (rpm). Then the volume of air flowing into the intake is about 1 mm*0.5 μm*20 m/sec=$10^{-8}$ m/sec. Assuming for the moment typical air conditions for 60° C., then the density is 1.072 kg/m$^3$ and the specific heat us 1007.13 J/(kg*C) making the power to hear the air bearing 30° C. to be about ($10^{-8}$ nm/sec)*(1.072 kg/m$^3$)*(1007.13 J/(kg*C))*(30° C.)=0.32 mW. One skilled in the art will recognize that the heater will require more than this, but this is offered as an example of the kind of heat delivery which is useful for the intake heater 90H.

Figure 1B:
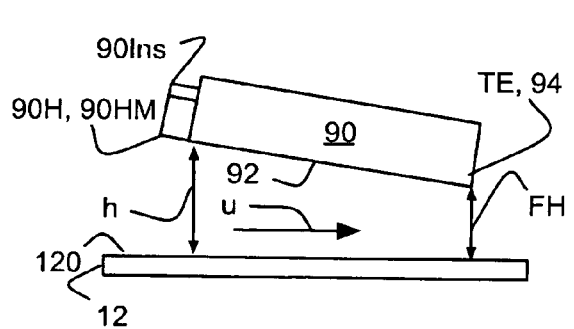
FIGS. 1B and 1C show some aspects of embodiments of the slider in accord with the invention.
Figure 1C:
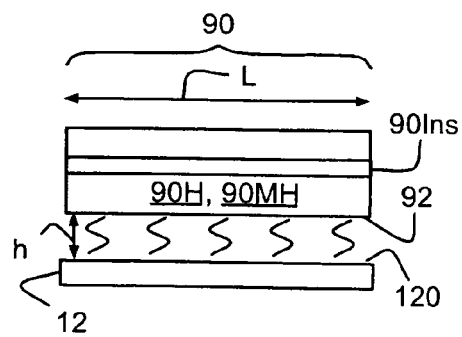
Figure 2A:
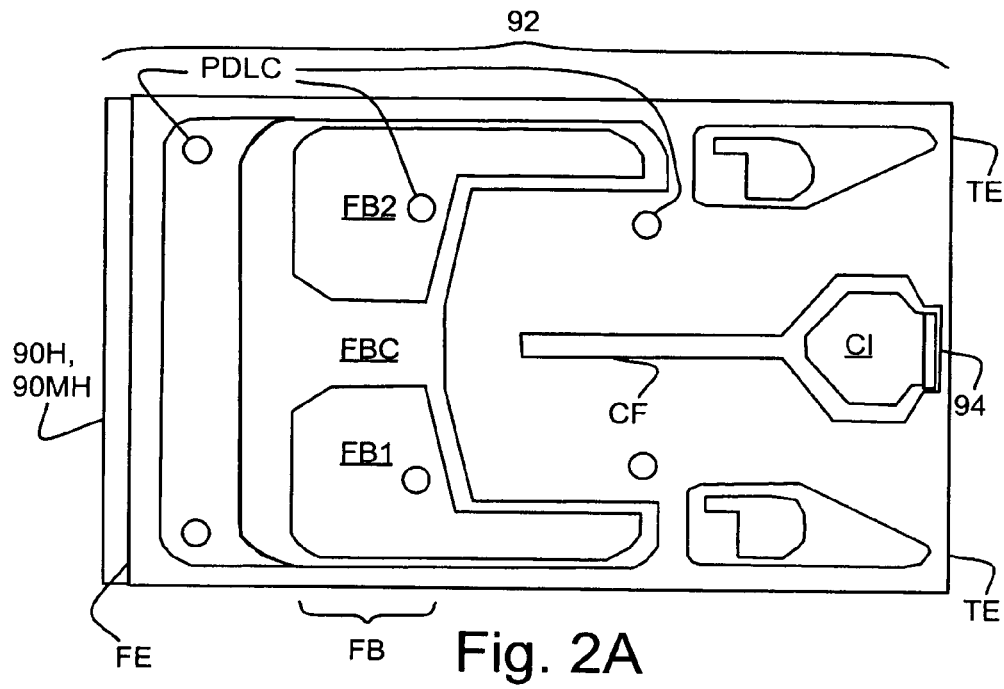
FIGS. 2A and 2B show some further aspects of the slider embodiments of FIGS. 1B and 1C.
Figure 2B:
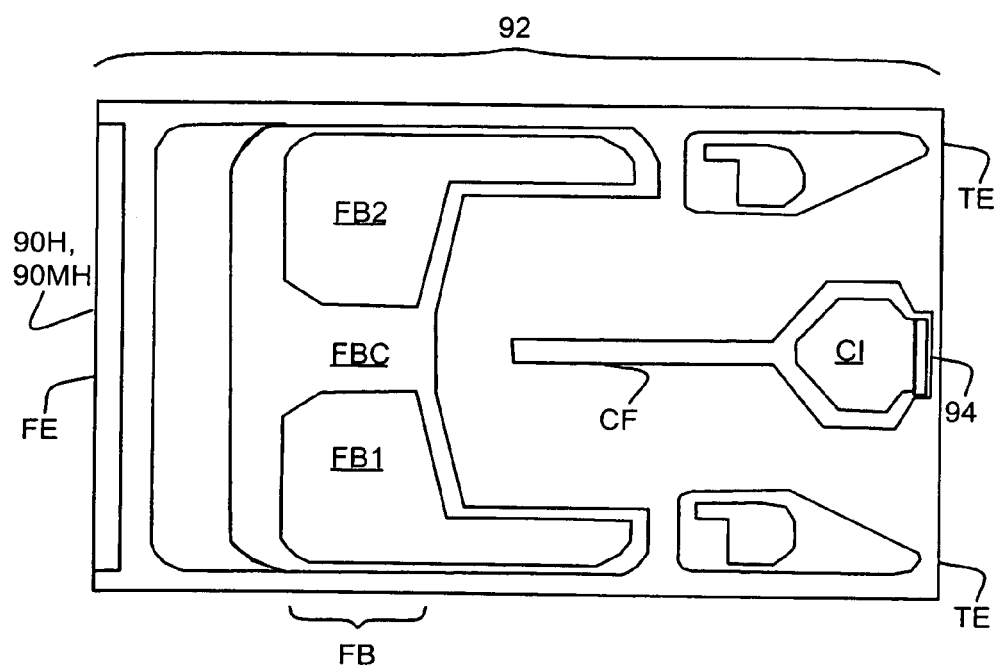
Figure 4A:
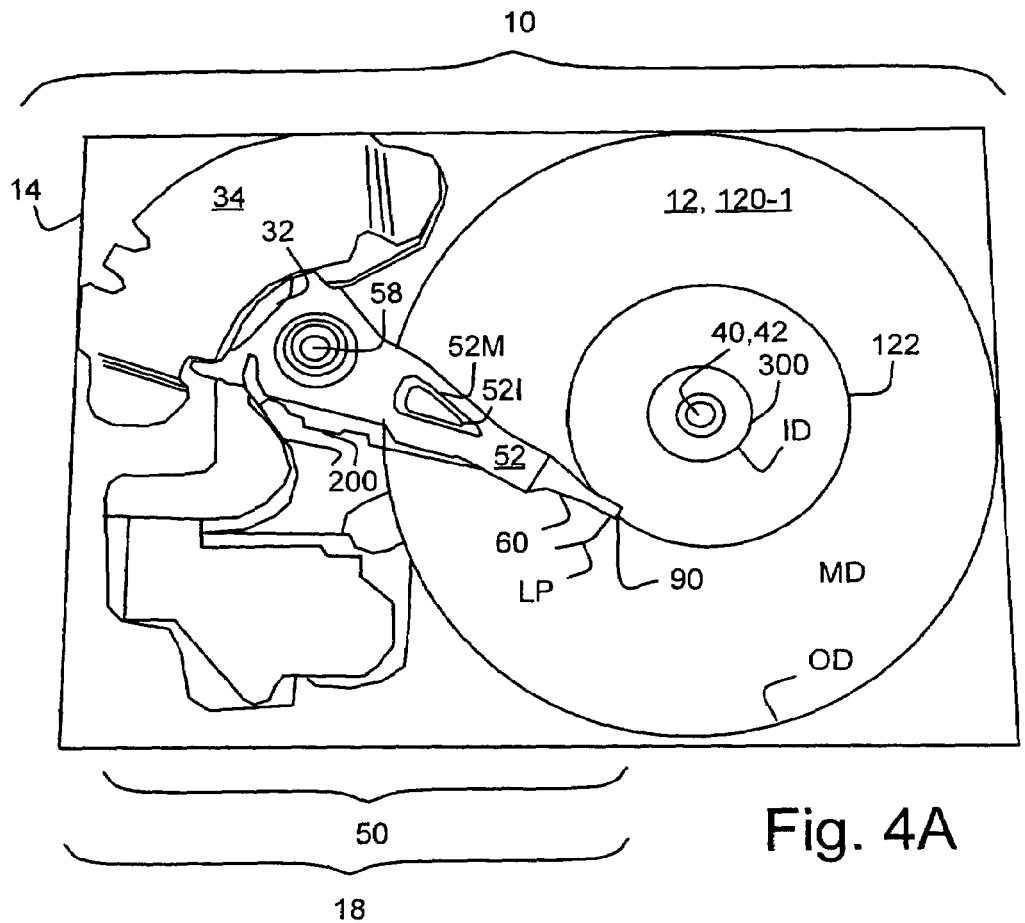
FIGS. 4A and 4B show some embodiments of the head stack assembly and hard disk drive using the head gimbal assembly of FIGS. 3A and 3B.

One embodiment of the slider 90 may preferably include the intake heater 90H and a thermal insulator 90I, which acts to direct the heat generated by the intake heater away from the surrounding environment and toward the intake as shown in FIGS. 1B and 1C. The air bearing surface 92 may further include a variety of features as shown in FIGS. 2A, 2B, 12B and 12C. The air bearing surface may preferably provide a central island CI near the trailing edge TE, in part to protect the read-write head 94 from particle collisions. The air bearing surface may provide a front bulwark FB, which may include a front bulwark channel FBC effectively dividing the front bulwark into a first front bulwark FB1 and a second front bulwark FB2. The air bearing surface may include at least one pad PDLC (pad with diamond like carbon), which are frequently used to reduce static friction (stiction) during takeoff and landing in a Contact Start-Stop (CSS) hard disk drive 10. These pads are labeled in FIG. 2A and shown there and in FIGS. 12B and 12C as circles. Air bearing surfaces without these pads are often used in hard disk drives which park their sliders with ramps, located either near the inside diameter ID or the outside diameter OD of the disk surface 120, as shown in FIG. 4A.

Alternatively an embodiment of the slider 90 may include means for heating 90 MH air moving between the air bearing surface 92 of the slider and the rotating disk surface 120 to increase the temperature of the air as shown in FIG. 1B. The means for heating may preferably include an intake heater 90H near a front edge FH of the slider for heating the air moving between the air bearing surface and the rotating disk surface. The slider may further include a thermal insulator 90Ins to direct the heat toward an intake formed by the front edge and the rotating disk surface as shown in FIG. 1C.

The slider 90 may further include a vertical micro-actuator 98 which when stimulated by a vertical actuation control signal VcAC, alters the flying height FH of the slider 90, in particular the distance of the trailing edge TE and read-write head 94 from the rotating disk surface 120, as shown in 1B, 5A, 7A, 7B and 9. While the vertical micro-actuator may employ a piezoelectric effect, an electrostatic effect and/or a thermo-mechanical effect, today it is often preferred that it employ a thermo-mechanical effect, heating a deformation region 97, which causes the read-write head to be moved closer to the rotating disk surface, reducing the flying height. The slider may further include a vertical heater governor 95, which may limit the thermal conditions of the deformation region and prevent overheating of this region.

The read-write head 94 may preferably include a read head 94-R and a write head 94-W, where the read-write signal bundle rw includes a read differential signal pair r0 and a write differential signal pair w0. The slider 90 may include an amplifier 96 receiving the read differential signal pair from the read head 94-R to create an amplified ar0 which is then included read-write signal bundle rw.

Manufacturing the slider 90 may include forming the intake heater 90H near the front edge FE of the slider to create the slider and preferably forming the intake heater with the thermal insulator 90I near the front edge. The slider is a product of this manufacturing process.

Alternatively, manufacturing the slider 90 may include forming the means for heating 90 MH to create the slider. As before, the slider is a product of this manufacturing process. Manufacturing the slider may further include forming the means for heating may further include forming a thermal insulator 90Ins near the front end FE. Forming the means for heating may further include forming the intake heater 90H near the front edge.

The head gimbal assembly 60 preferably includes an embodiment of the invention's slider coupling through a flexure finger 20 to a load beam 74, as shown in FIGS. 3A to 4A, 5A, and 6 to 9. A hinge plate 70 couples the load beam a base plate 72.

Figure 3A:
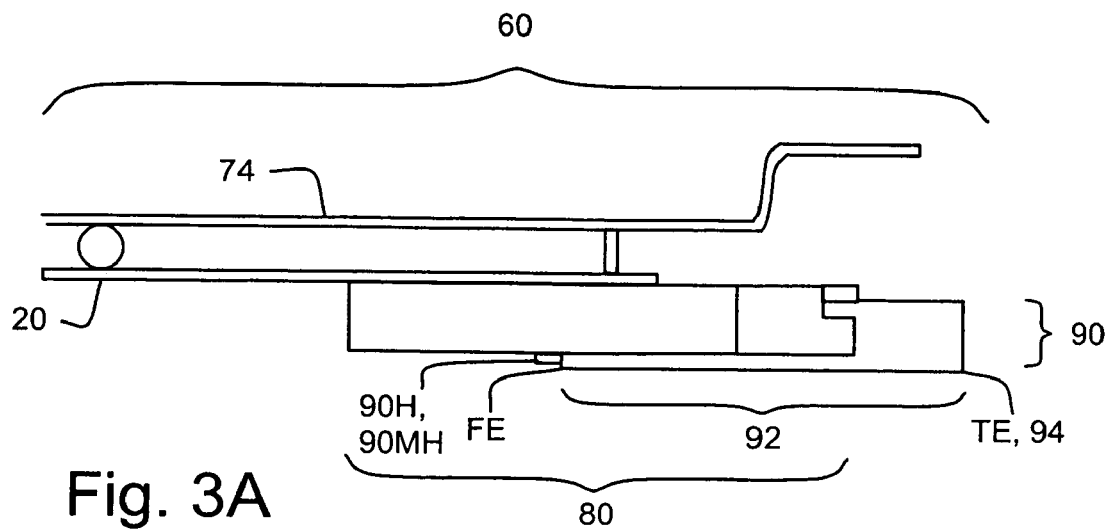
FIGS. 3A and 3B show some aspects of embodiments of the head gimbal assembly using the invention's embodiments of the slider.
Figure 5A:
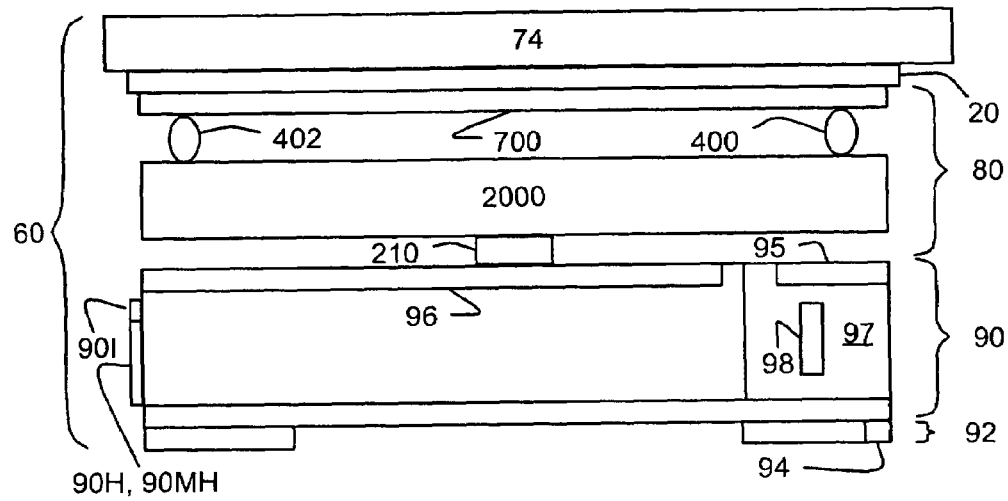
FIGS. 5A and 5B show an example of a head gimbal assembly embodiment using a micro-actuator assembly employing an electrostatic effect.

The head gimbal assembly 60 may preferably include a micro-actuator assembly 80 which preferably alters at least the lateral position LP of the slider 90 and its read-write head 94 over a track 122 on the rotating disk surface 120. The micro-actuator 80 may employ a piezoelectric effect as shown in FIG. 3A and/or a thermo-mechanical effect and/or an electrostatic effect as shown in FIG. 5A, and in greater detail in FIG. 5B. The micro-actuator assembly is preferably stimulated by a micro-actuator control signal bundle 82, which typically includes at least one lateral control signal LcAC. The micro-actuator assembly may further include ports receiving one or more shared signals, such as a shared ground signal shown as signal SP1 in the flexure finger 20 and port 82P1 in FIGS. 7A and 7B.

Figure 5B:
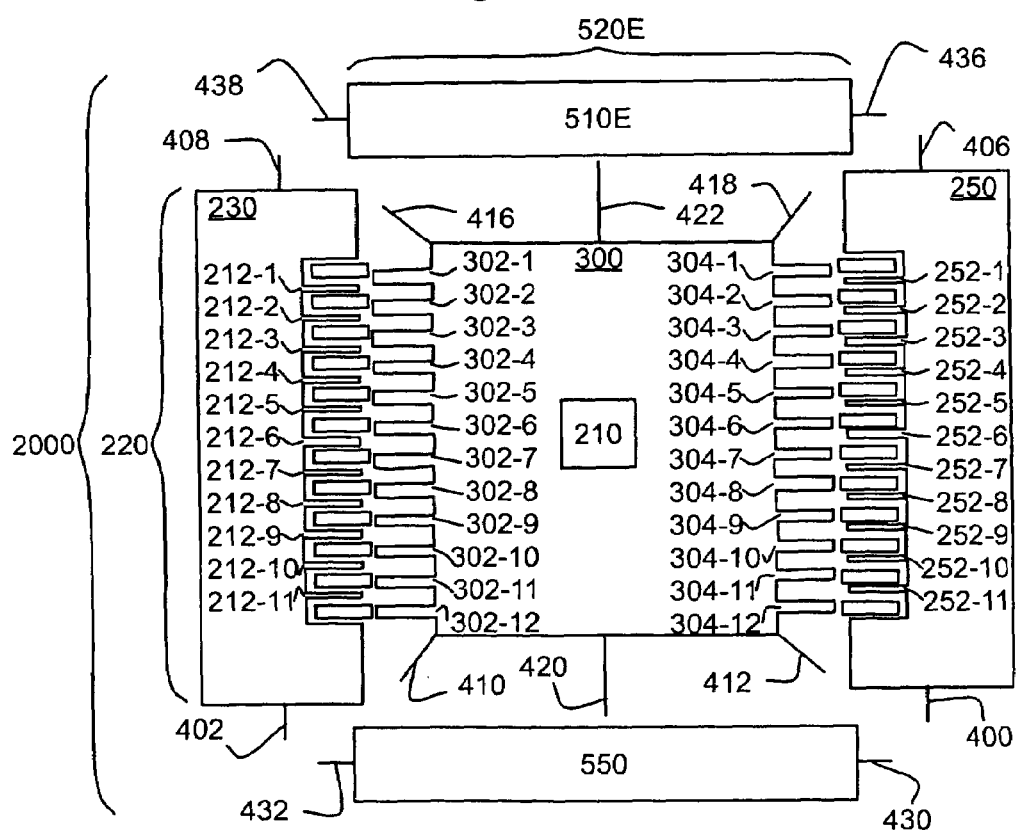
Figure 6:
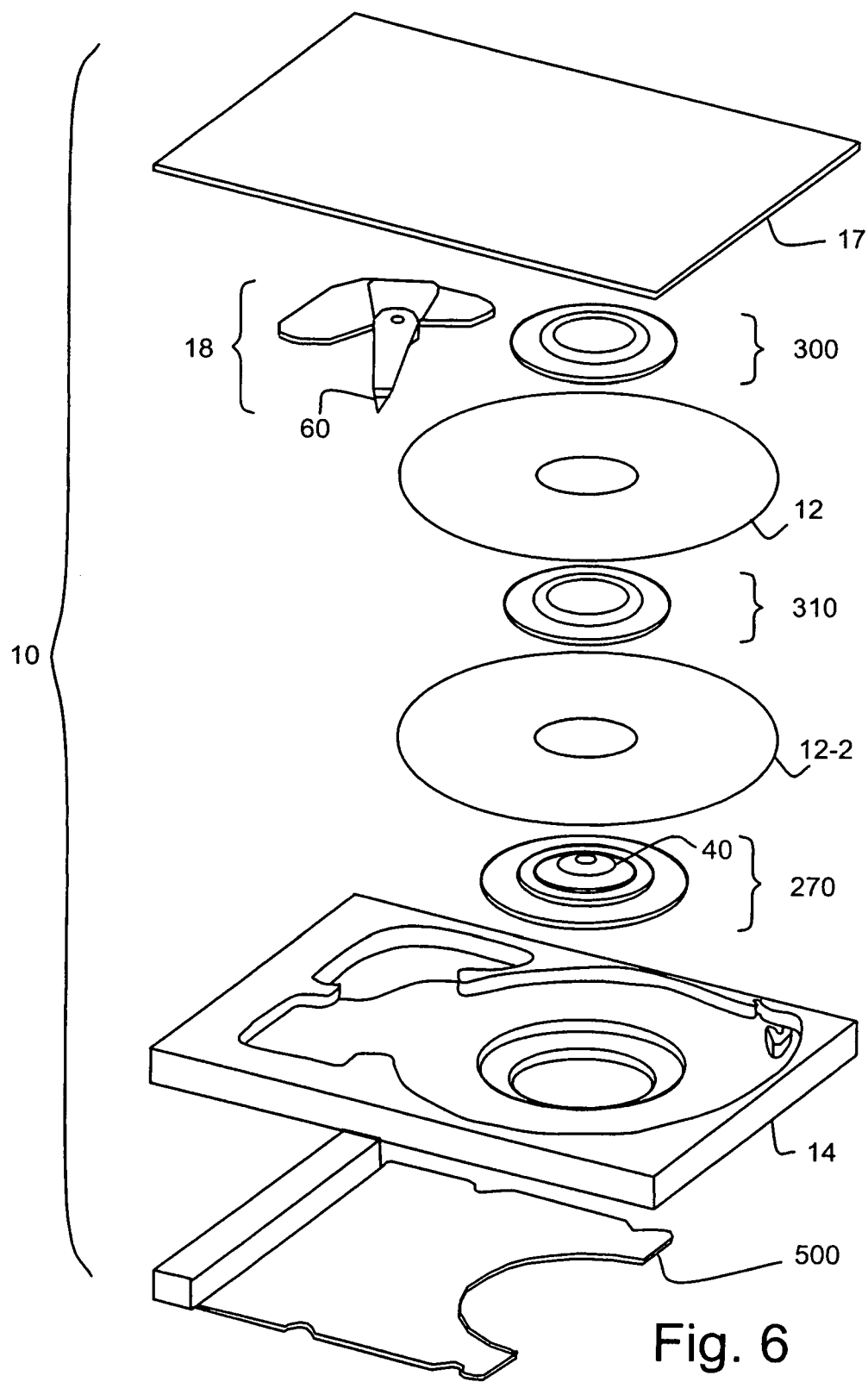
Figure 7A:
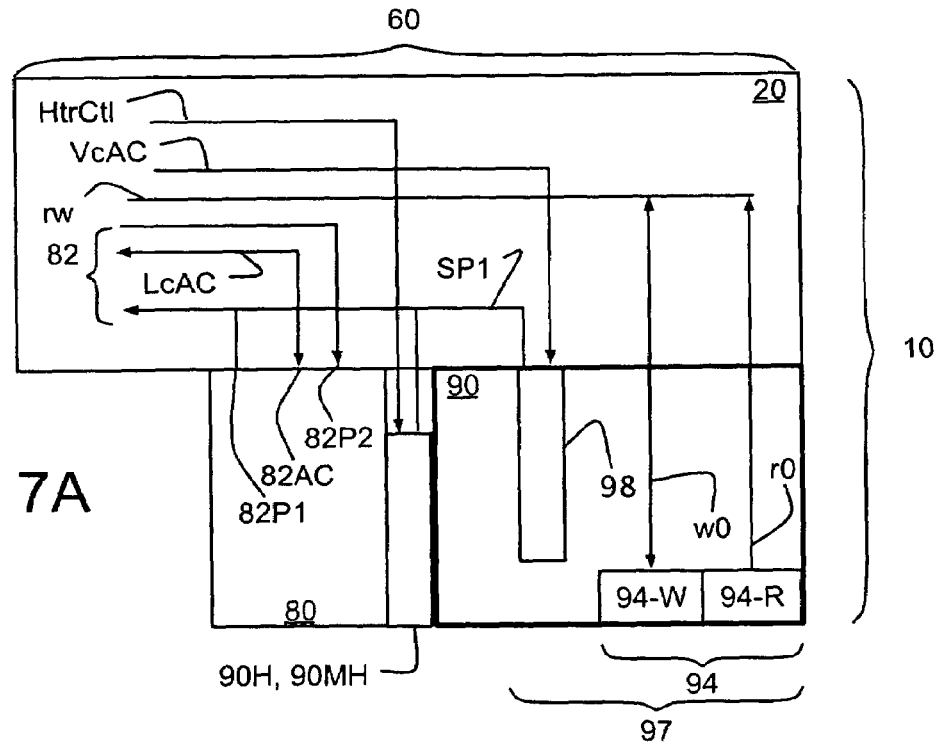
Figure 7B:
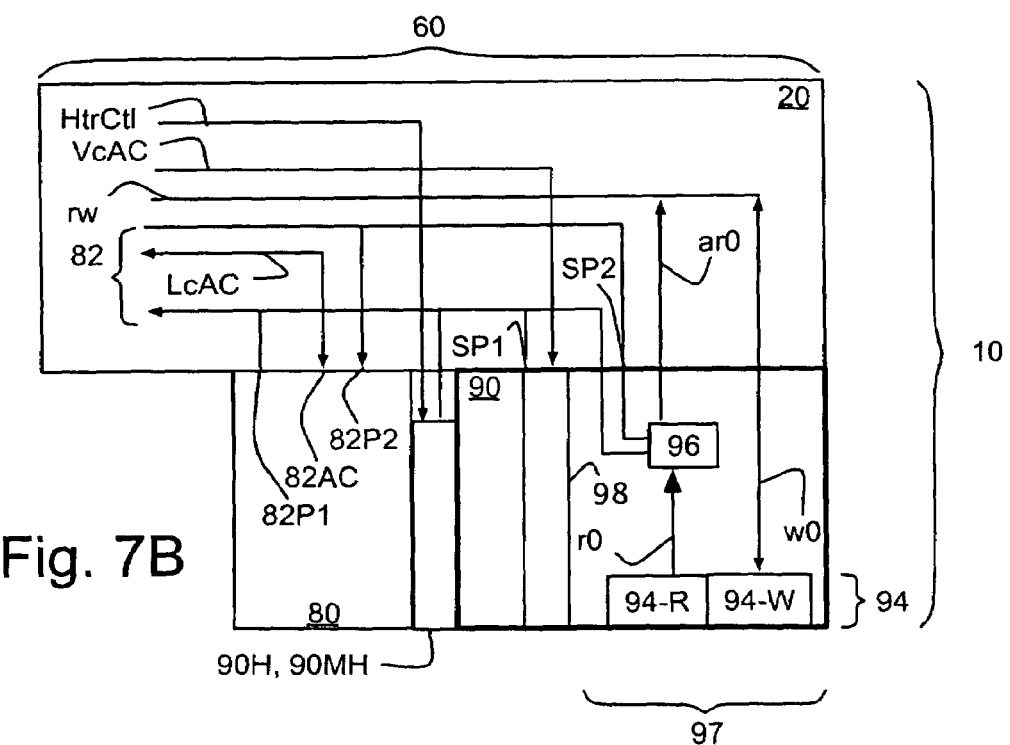

The micro-actuator assembly 80 employing an electrostatic effect is shown in FIG. 5A coupling a slider 90 with a flexure flinger 20 on a load beam 74. The micro-actuator assembly includes a first micro-actuator 220 as shown in FIG. 5B. The first micro-actuator 220 includes the following. A first pivot spring pair 402 and 408 coupling to a first stator 230. A second pivot spring pair 400 and 406 coupling to a second stator 250. A first flexure spring pair 410 and 416, and a second flexure spring pair 412 and 418, coupling to a central movable section 300. A pitch spring pair 420-422 coupling to the central movable section 300. The central movable section 300 includes signal pair paths coupling to the read differential signal pair R+− and the write differential signal pair W+− of the read-write head of the slider. This kind of micro-actuator assembly is discussed in greater detail in the U.S. patent application Ser. No. 10/986,345 and filed Nov. 10, 2004, and is incorporated herein by reference.

Figure 4B:
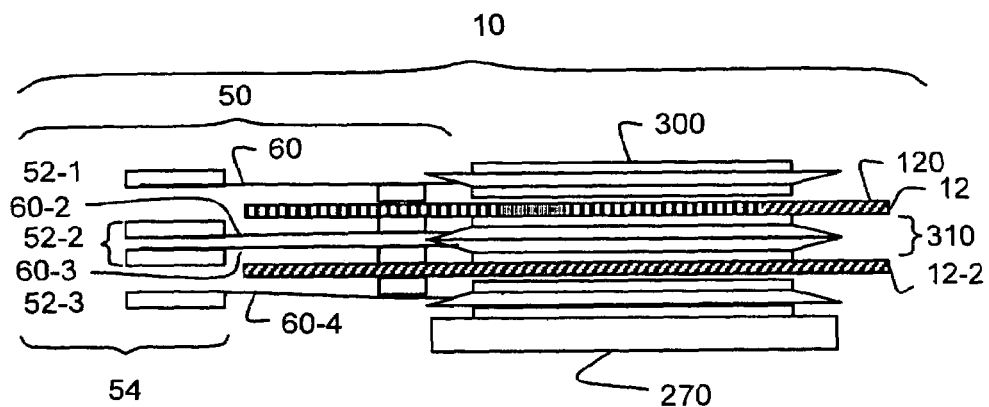

The invention's head stack assembly 50 including at least one of head gimbal assembly 60 coupled to a head stack 54. The head stack assembly may include more than one head gimbal assembly coupled to the head stack, as shown in FIG. 4B. Manufacturing the head stack assembly includes coupling the head gimbal assemblies to the head stack to create the head stack assembly as a product of this manufacturing process, often preferably done by swaging the base plate 72 of each head gimbal assembly to an actuator arm 54 of the head stack. An actuator arm may be thus coupled to one or two head gimbal assemblies.

Figure 3B:
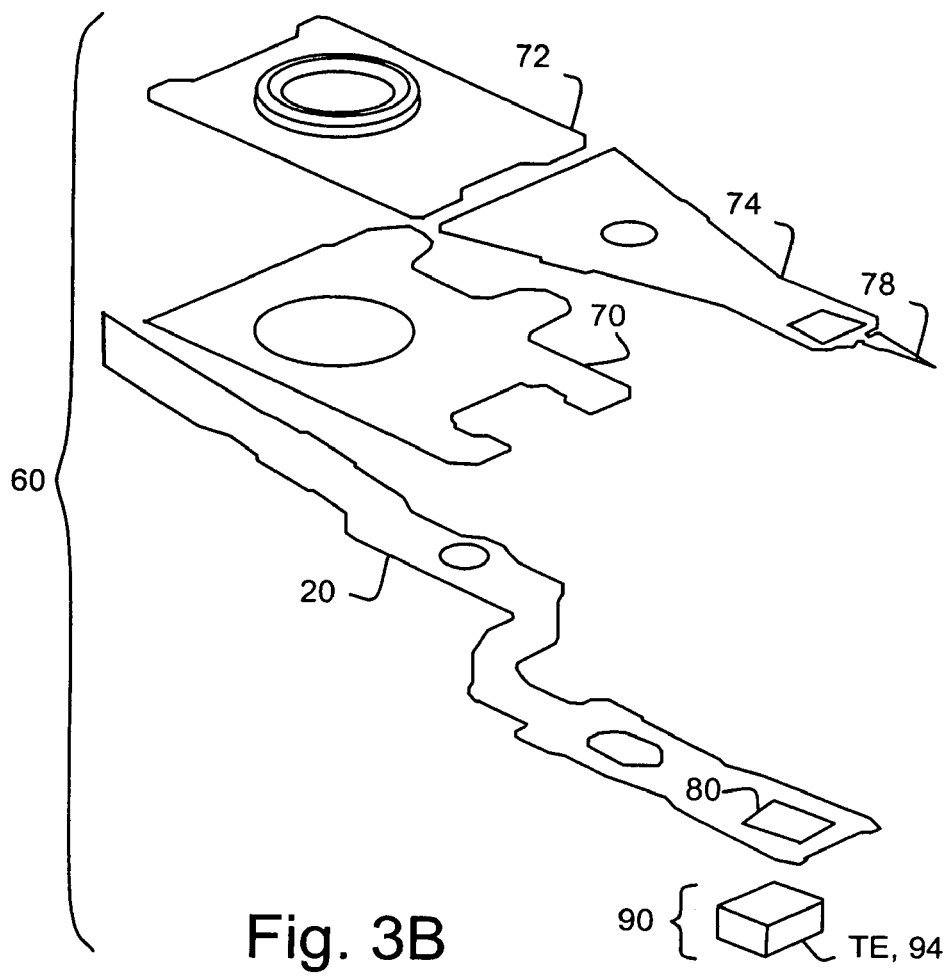

A CSS hard disk drive 10 typically parks its slider 90 on the disk surface 120 near the inside diameter ID and may preferably employ a tab ramp 78 on the load beam 74 of a head gimbal assembly including the slider 90 as shown in FIG. 3B to engage with a beveled surface on the spindle motor 270, a disk spacer 310 and/or a disk clamp 300 as shown in FIG. 4B.

Manufacturing the head gimbal assembly 60 preferably includes coupling the slider 90 through a flexure finger 20 to a load beam to create the head gimbal assembly as a product of this manufacturing process.

In general, the hard disk drive 10 preferably includes both a temperature sensor 16T and a humidity sensor 16H which sensor-couple 16C to an embedded circuit 500 and further preferably sensor-couples to an embedded processor 502 as shown in FIGS. 8A, 8B, 8I, 9 and 10A. The embedded circuit, and preferably the embedded processor, directs the hard disk drive to operate by receiving a temperature reading 170T from the temperature sensor 16T and a humidity reading 170H from the humidity sensor 16H. A heater control signal HCS is determined based upon the temperature reading and the humidity reading, which is then asserted to stimulate the means for heating 90 MH, and preferably the intake heater 90H on the slider 90 to increase the air temperature between the air bearing surface 92 and the rotating disk surface 120.

Figure 8A:
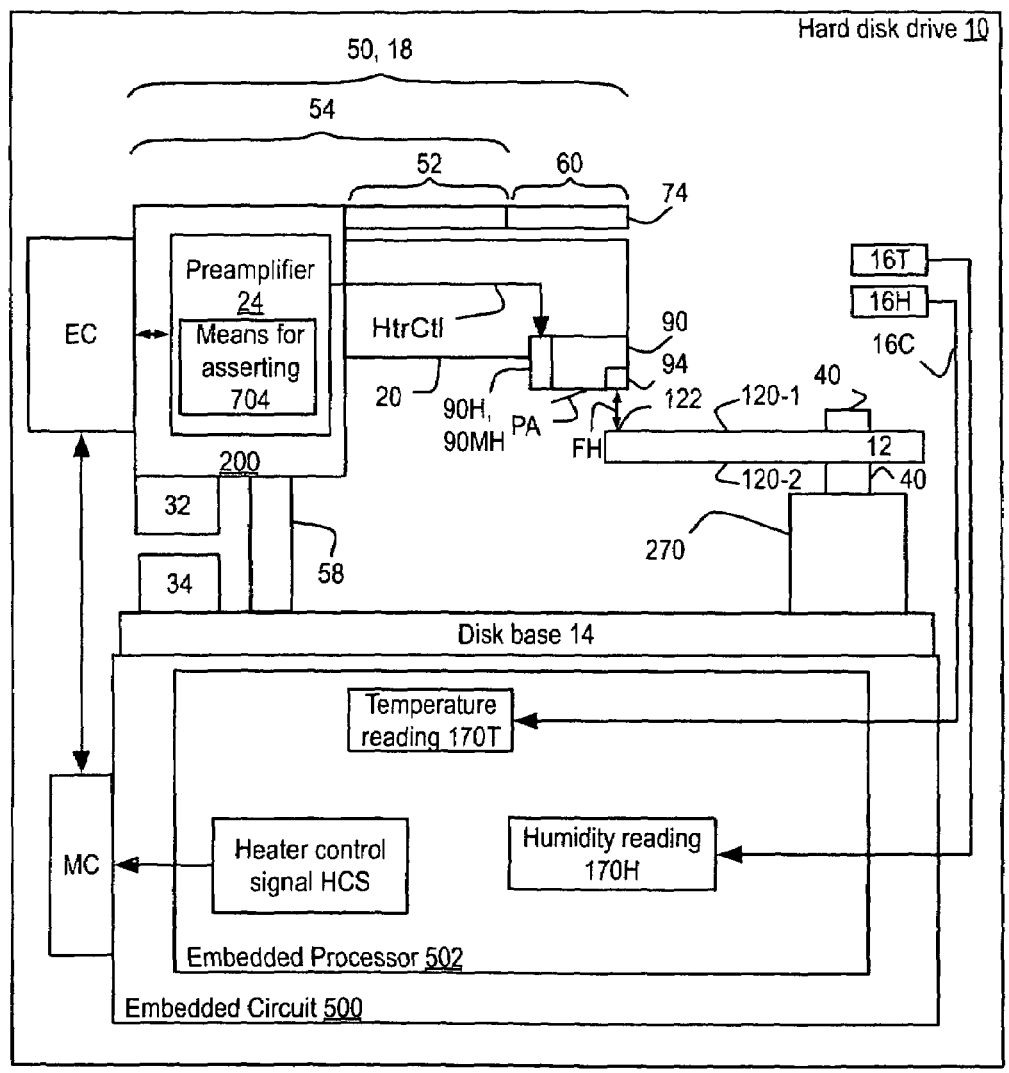
Figure 8B:
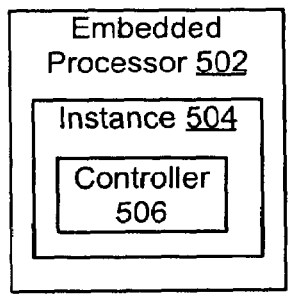
FIGS. 8B to 8H show some details of some aspects various embodiments of the embedded processor of FIG. 8A.
Figure 8C:
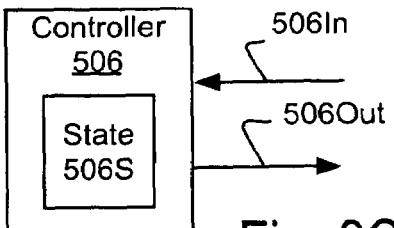

Embodiments of the embedded processor 502 may preferably include at least one instance 504 of a controller 506, as shown in FIG. 8B. As used herein each controller receives at least one input 506In, maintains and updates at least one state 506S and generates at least one output 506Out based upon at least one of the inputs and/or at least one of the states, as shown in FIG. 8C.

Figure 8D:
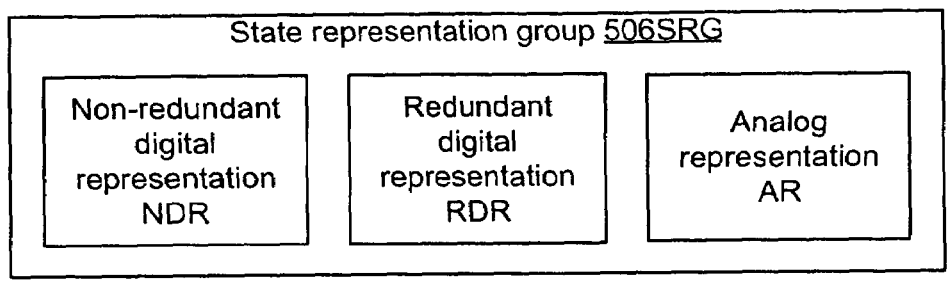
Figure 8E:
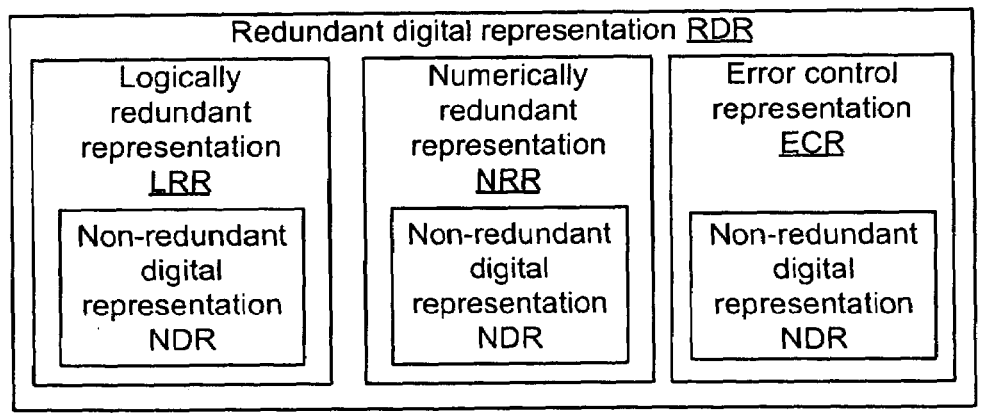

At least one state 506S may include at least one member of a state representation group 506SRG consisting of a non-redundant digital representation NDR, a redundant digital representation RDR and/or an analog representation AR, as shown in FIG. 8D. A non-redundant digital representation frequently comprises at least one digit, which may frequently represent a bit with values of 0 and 1, a byte including eight bits, and so on.

A redundant digital representation RDR of a non-redundant digital representation NDR may include a numerically redundant digital representation NRR, and/or an error control representation ECR and/or a logically redundant representation LRR. The following examples will serve to illustrate these non-redundant representations:

An example of a numerically redundant representation NRR may be found in a standard multiplier, which will often use a local carry propagate adder to add three or four numbers together to generate two numeric components which redundant represent the numeric result of the addition.

An example of an error control representation ECR will frequently use the non-redundant digital representation NDR and an additional component formed as the function of the non-redundant digital representation. If this error control representation is altered by a few number of bits, a error correcting function reconstructs the original non-redundant digital representation. Quantum computers are considered as controllers, which will tend to use this kind of error control representations for at least some states.

An example of a logically redundant representation LRR may be found in the definition and implementation of many embodiments of a finite state machine FSM, which often require that a single state 506S be represented by any member of a multi-element set of non-redundant digital representations. Often the members of this set differ from at least one other member of the set by just one bit. Use of such logically redundant representations insures that the generation of glitches is minimized.

Figure 8F:
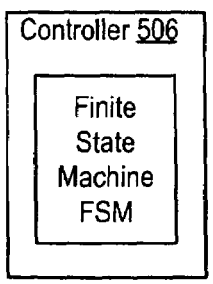
Figure 8G:
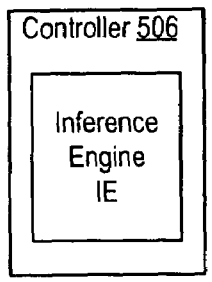
Figure 8H:
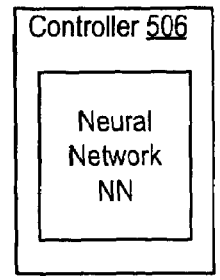
Figure 9:
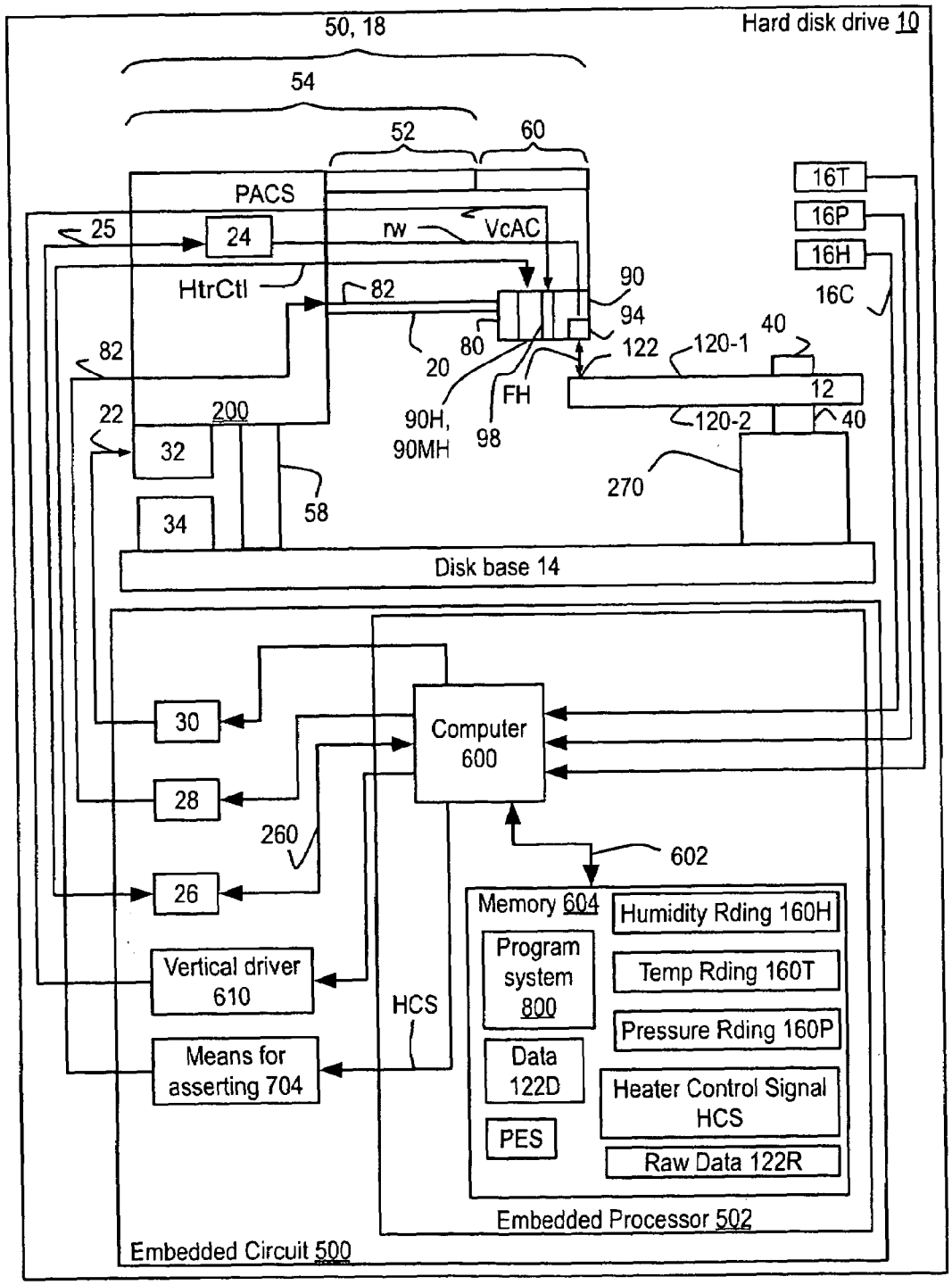

Each of controller 506 may include at least one instance of at least one of the following:
A computer 600 directed by a program system 800 and accessibly coupled 602 via a buss a memory 604, wherein the program system includes at least one program step residing in the memory. Where a computer includes at least one data processor and at least one instruction processor, and each data processor is directed by at least one of the instruction processors as shown in FIG. 9.
A finite state machine FSM as shown in FIG. 8F.
An inferential engine IE as shown in FIG. 8G.
And a neural network NN as shown in FIG. 8H.

Embodiments of the embedded processor may implement this method of operation by including means for receiving the temperature reading from the temperature sensor and the humidity reading from the humidity sensor and means for determining the heater control signal based upon the temperature reading and the humidity reading.

Figure 8I:
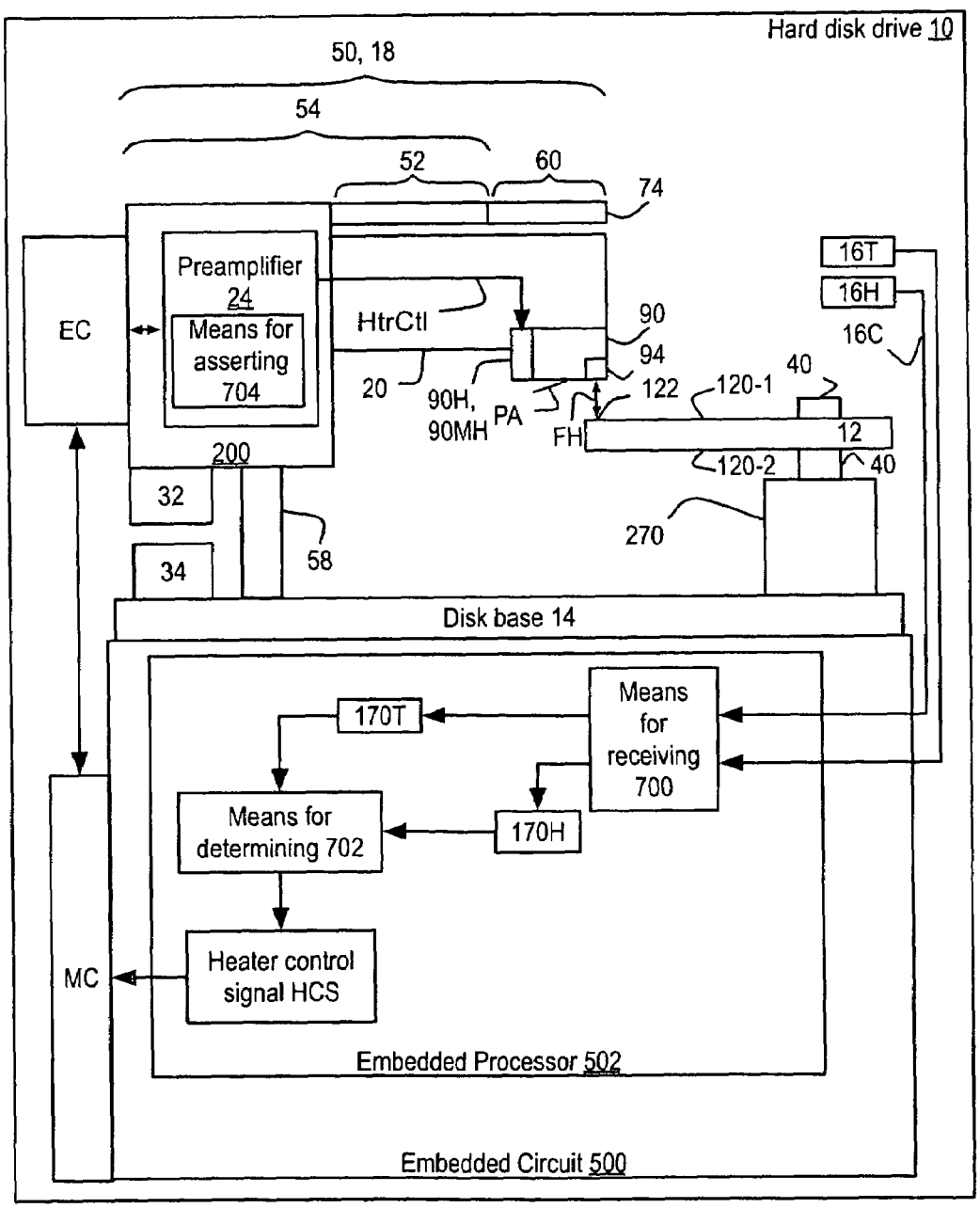

The embedded circuit directs the hard disk drive to operate by receiving 700 a temperature reading 170T from the temperature sensor and a humidity reading 170H from the humidity sensor 16H, and preferably includes an embedded processor 502. A heater control signal HCS is determined 702 based upon the temperature reading and the humidity reading, which is then asserted 704 to stimulate the intake heater 90H on the slider 90 to increase the air temperature between the air bearing surface 92 and the rotating disk surface 120. In many embodiments, the embedded circuit and possibly the embedded processor may communicate via a main coupling MC through a ribbon cable to a second coupling EC as shown in FIGS. 8A and 8I.

The embedded circuit 500 may implement this method of operation by including means for receiving 700 the temperature reading 170T from the temperature sensor and the humidity reading 170H from the humidity sensor 16H. Means for determining 704 the heater control signal HCS based upon the temperature reading and the humidity reading.

The hard disk drive 10 may include the means for asserting 704 the heater control signal to stimulate the intake heater 90H on the slider 90 to increase the air temperature between the air bearing surface 92 and the rotating disk surface 120, as shown in FIG. 8. Alternatively, the embedded circuit 500 may include the means for asserting, as shown in FIG. 9.

The means group consisting of the means for receiving 700, the means for determining 702 and the means for asserting 704 may be implemented using at least one instance of at least one of the following:
A computer 600 accessibly coupled 602 a memory 604 and directed by a program system 800 including at least one program step residing in the memory as shown in FIG. 9. As used herein, a computer will include at least one instruction processor and at least one data processor, wherein each of the data processors is directed by at least one instruction processor.
A finite state machine 710 as shown in FIG. 11B.
An inference engine 712 as shown in FIG. 11C.
And a neural network 714 as shown in FIG. 11D.

Some of the following figures show flowcharts of at least one method of the invention, possessing arrows with reference numbers. These arrows will signify of flow of control and sometimes data supporting implementations including:
at least one program operation or program thread executing upon a computer 600, at least one inferential link in an inferential engine EE,
at least one state transitions in a finite state machine FSM,
and/or at least one dominant learned response within a neural network NN.

The operation of starting a flowchart is designated by an oval with the text "Start" in it, and refers to at least one of the following:
  Entering a subroutine in a macro instruction sequence in a computer 600.
  Entering into a deeper node of an inferential graph of an inference engine IE.
  Directing a state transition in a finite state machine FSM, possibly while pushing a return state.
  And triggering a list of at least one neuron and/or at least one synaptic connection in a neural network NN.

The operation of termination in a flowchart is designated by an oval with the text "Exit" in it, and refers to the completion of those operations, which may result in at least one of the following:
  return from a subroutine in a computer 600,
  traversal of a higher node in the inferential graph of an inference engine IE,
  popping of a previously stored state in a finite state machine FSM,
  and/or return to dormancy of the firing neurons of the neural network NN.

Figure 10A:
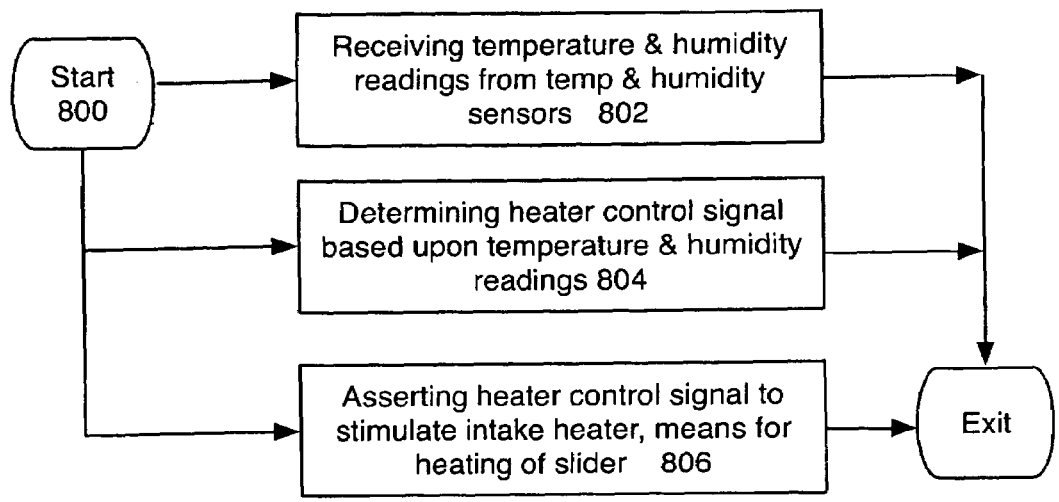

The program system 800 may preferably include at least one of the operations of FIG. 10A:
  Operation 802 supports receiving 700 the temperature reading 170T from the temperature sensor 16T and the humidity reading 170H from the humidity sensor 16H.
  Operation 804 supports determining 702 the heater control signal HCS based upon the temperature reading and the humidity reading.
  And operation 806 supports asserting 704 the heater control signal to stimulate the intake heater 90H of the slider 90.

In certain embodiments, each member of the means group consisting of the means for receiving 700, the means for determining 702 and the means for asserting 704 may be implemented in the embedded circuit 500, as shown in FIG. 9, and may further be implemented by a single computer 600, with the program system 800 including a version of each of the operations of FIG. 10A.

Figure 10B:
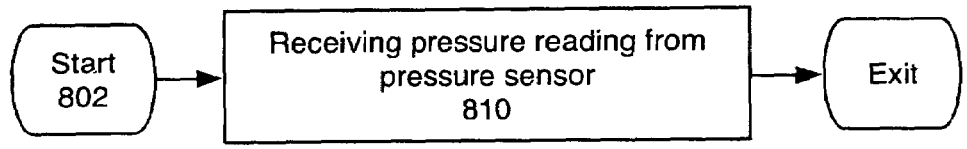
Figure 10C:
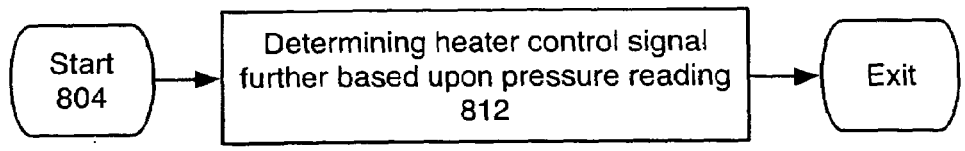

The hard disk drive 10 may further include a pressure sensor 16P as shown in FIG. 9, with the means for receiving 700 further including receiving a pressure reading from the pressure sensor, which is shown supported by operation 810 of FIG. 10B. The means for determining 702 may further include determining the heater control signal HCS based upon the pressure reading, which is shown supported by operation 812 of FIG. 11C.

Figure 11A:
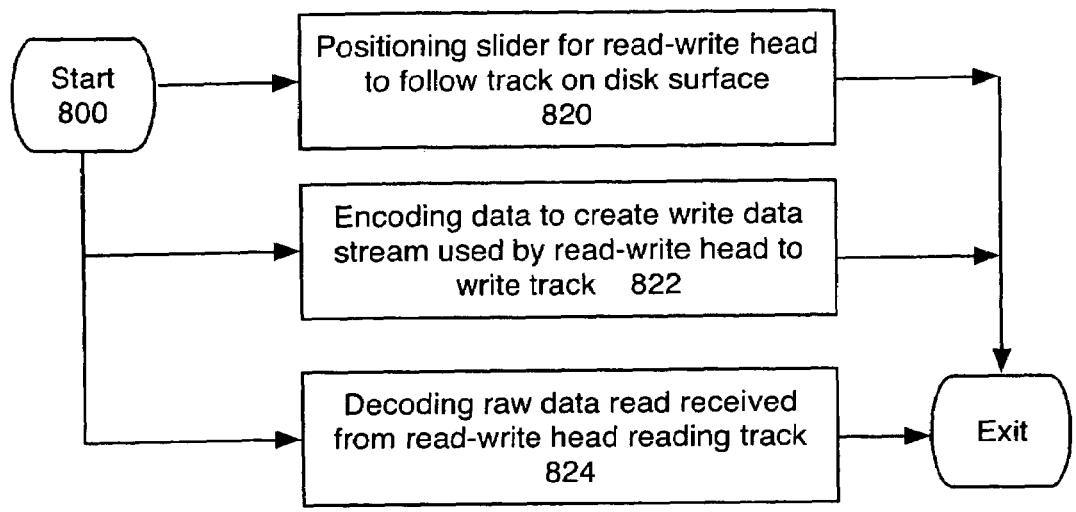
Figure 11B:
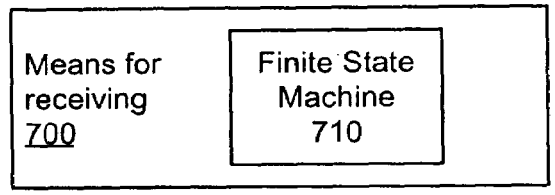
FIGS. 11B to 11D show some aspects of the means of FIG. 8B.
Figure 11C:
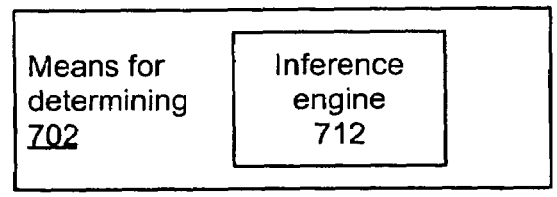
Figure 11D:
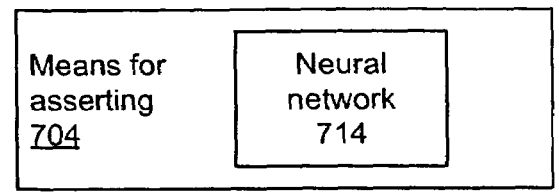

The computer 600 may further implement at least one of the operations of FIG. 11A, as shown by the program system 800 further include at least one of the following:
  Operation 820 supports positioning the slider 90 for the read-write head 94 to follow the track 122 on the rotating disk surface 120, which is often referred to as track-following mode. In greater detail, the voice coil motor 18 moves the head stack assembly 50 by pivoting the head stack 54 through the actuator pivot 58 based upon the electromagnetic attraction and repulsion of the voice coil 32 with the fixed magnet 34. The voice coil is stimulated by a voice coil control signal shown sent by the computer to a voice coil driver 30, which provides the voice coil stimulus 22 to the voice coil as a time-altering electrical signal. This activity provides the coarse control of the lateral position LP over the track on the rotating disk surface. The fine motion control is performed by the micro-actuator driver 28 and directed by the computer to generate the micro-actuator control signal bundle 82. While the micro-actuator assembly may include a vertical micro-actuator, currently it is often preferred that the slider include it. The vertical actuation control signal VcAC may be provided by a vertical micro-actuator driver 26 as shown in FIG. 9 in the embedded circuit 500, or alternatively, it may be part of the main flex circuit 200, possibly included in the preamplifier 24. Feedback for the track-following operation comes from the read head 94-R and is based upon the read differential signal pair r0, and possibly the amplified read signal arO provided to the preamplifier, which then sends a Position Error Signal (PES) through the channel interface 26 and a channel interface communications interface 260 to the computer, where the PES signal is frequently stored in the memory. Often a succession of timed samples of PES are stored, filtered and used to calculate the stimulus and controls of the above mentioned drivers stimulating the voice coil motor, the micro-actuator assembly, and the vertical micro-actuator.

Operation 822 supports encoding the data to create the 122D write data stream used by the read-write head to write the track. Typically, the write data stream is sent through a channel interface 26 to the preamplifier 24, where it is amplified and sometimes filtered before transmission through the read-write signal bundle to the read-write head, in particular, through the write differential signal bundle w0 to the write head 94-W. This operation often entails constructing a header and/or trailer to the data payload that the users are familiar with. Usually, this involves one or more error detecting/correcting coding schemes.

Operation 824 supports decoding the raw data 122R received from the read-write head 94, in particular the read head 94-R, from reading the track 122. This operation is often the reverse of the encoding operation 822, in that the header and/or trailer are used to calculate a potentially corrected data payload, which is the retrieved data users see from accessing the track.

Typically, no one computer does all three of the operations of this flowchart. Typically, the first operation 820 is done by one computer, which is often known as the servo computer, and the other operations 822 and 824 are done by a second computer, which is sometimes referred to as the embedded computer.

Figure 12A:
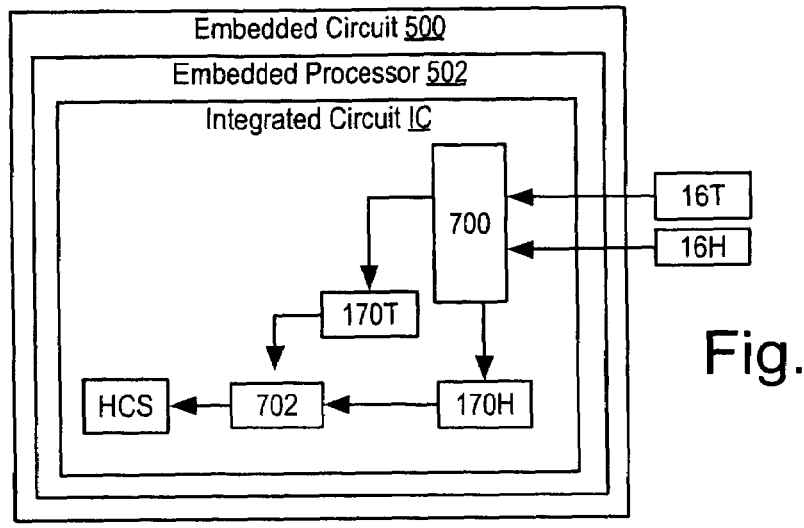
FIG. 12A shows an embodiment of the embedded circuit and/or embedded processor including an integrated circuit.
Figure 12B:
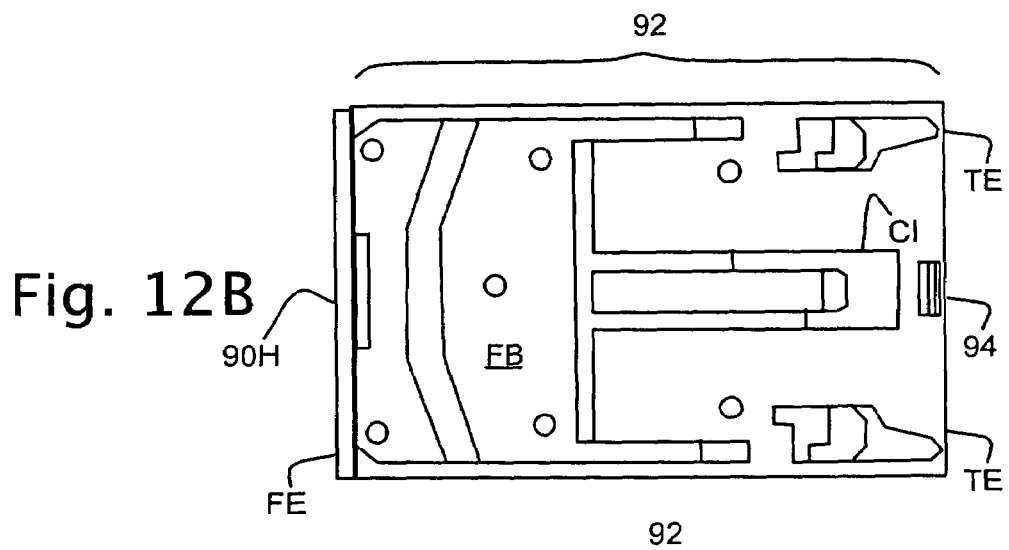
FIGS. 12B and 12C show more examples of the air bearing surfaces which may be included in embodiments of the slider of previous Figures.
Figure 12C:
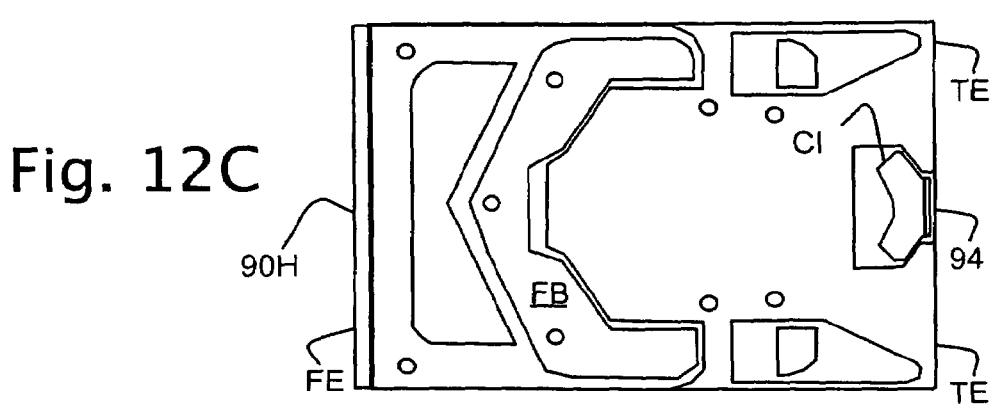

The embedded circuit 500 may further include an integrated circuit IC including the means for receiving 700 the temperature reading 170T and the humidity reading 170H, both presented to the means for determining 702 the heater control signal HCS, as shown in FIG. 12A.

Manufacturing the embedded circuit 500 may include providing the means for receiving 700 and the means for determining 702 to create the embedded circuit, which may preferably include programming a non-volatile memory component of the memory 604 accessibly coupled 602 to the computer 600. The embedded circuit is a product of this manufacturing process.

Manufacturing the hard disk drive 10 may include coupling the temperature sensor 16T and the humidity sensor 16H to the embedded circuit to provide the temperature reading 170T and the humidity reading 170H, and coupling the embedded circuit 500 to the head stack assembly 50 to provide the heating control HtrCtl to stimulate the intake heater 90H of the slider 90, thereby creating the hard disk drive. The hard disk drive is a product of this process.

The preceding embodiments provide examples of the invention and are not meant to constrain the scope of the following claims.

What is claimed is:

1. A method of operating a slider near a rotating disk surface in a hard disk drive, comprising the steps:
heating air near a front edge of said slider moving between an air bearing surface of said slider and said rotating disk surface to increase the temperature of said air; and
said increase of said temperature of said air between said air bearing surface and said rotating disk surface reducing the drop in flying height of the trailing edge of said slider to said rotating disk surface.

2. The slider implementing the method of claim 1, comprising:
means for heating air moving between said air bearing surface of said slider and said rotating disk surface to increase the temperature of said air.

3. The slider of claim 2, wherein said means for heating, comprising:
an intake heater near a front edge of said slider for heating said air moving between said air bearing surface and said rotating disk surface.

4. The slider of claim 3, further comprising: a thermal insulator to direct said heat toward an intake formed by said front edge and said rotating disk surface.

5. The slider of claim 2, further comprising: an air bearing surface with at least one pad with diamond like carbon.

6. A method of manufacturing said slider of claim 2, comprising the step: forming said means for heating to create said slider.

7. The method of claim 6, further comprising the step: forming a thermal insulator near a front end to further create said slider.

8. The method of claim 6, wherein the step forming said means for heating, further comprises the step: forming said intake heater near said front edge to create said slider.

9. The slider as a product of the process of claim 6.

10. The slider comprising:
an intake heater near a front edge of said slider for heating said air moving between an air bearing surface and a rotating disk surface in a hard disk drive, whereby
said increase of said temperature of said air between said air bearing surface and said rotating disk surface reducing the drop in flying height of the trailing edge of said slider to said rotating disk surface.

11. The slider of claim 10, further comprising: a thermal insulator near said intake heater to direct said heat from said intake heater toward an intake formed by said front edge and said rotating disk surface.

12. The slider of claim 10, further comprising: an air bearing surface with at least one pad with diamond like carbon.

13. A method of manufacturing said slider of claim 10, comprising the step: forming said intake heater near said front edge to create said slider.

14. The method of claim 13 further comprising the step: forming a thermal insulator near said intake heater to further create said slider.

15. The slider as a product of the process of claim 13.

16. A head gimbal assembly, including said slider of claim 10 coupling through a flexure finger to a load beam.

17. A method of manufacturing said head gimbals assembly of claim 16, comprising the step:
coupling said slider through said flexure finger to said load beam to create said head gimbals assembly.

18. A head stack assembly for use in said hard disk drive, comprising: a head stack coupled to at least one of said head gimbals assemblies of claim 16.

19. A method of manufacturing said head stack assembly of claim 18, comprising the step: coupling said head gimbal assemblies to said head stack to create said head stack assembly.

20. The head stack assembly as a product of the process of claim 19.

21. A method of operating said hard disk drive using said head stack assembly of claim 18, comprising the steps:
receiving a temperature reading from a temperature sensor and a humidity reading from a humidity sensor, both included in said hard disk drive;
determining a heater control signal based upon said temperature reading and said humidity reading; and
asserting said heater control signal to create a heating control stimulating said intake heater to heat said air passing between said front edge of said slider and said rotating disk surface.

22. An embedded circuit for directing operation of said hard disk drive to implement the method of claim 21, comprising:
an embedded processor receiving said temperature reading and said humidity reading; and
said embedded processor determining said heater control signal based upon said temperature reading and said humidity reading.

23. The embedded processor of claim 22, comprising: at least one instance of a controller;
wherein each of said controllers included in said embedded processor,
said controller receives at least one input,
said controller maintains and updates at least one state, and
said controller generates at least one output based upon at least one member of a group consisting of: said inputs and said states;
wherein at least one of said states of at least one of said controllers includes at least one member of the group consisting of a non-redundant digital representation, a redundant digital representation, and an analog representation.

24. The embedded processor of claim 23, further comprising:
means for receiving said temperature reading and said humidity reading; and
means for determining said heater control signal based upon said temperature reading and said humidity reading.

25. The embedded circuit of claim 24, further comprising:
means for asserting said heater control signal to create said heating control stimulating said intake heater to heat said air passing between said front edge of said slider and said rotating disk surface.

26. The embedded controller of claim 25, wherein at least one member of the means group includes at least one instance of a member of the group consisting of the members:
a computer accessibly coupled to a memory and directed by a program system including program steps residing in said memory; wherein said computer includes at least one data processor and at least one instruction processor; wherein each of said data processors is directed by at least one of said instruction processors;
a finite state machine;
an inferential engine; and
a neural network;

wherein said means group, consists of the members: said means for receiving, said means for determining, and said means for asserting.

27. The program system of claim 26, comprising at least one of the program steps:
receiving said temperature reading and said humidity reading;
determining said heater control signal based upon said temperature reading and said humidity reading; and
asserting said heater control signal.

28. The program system of claim 27, further comprising each of said steps:
receiving said temperature reading and said humidity reading;
determining said heater control signal based upon said temperature reading and said humidity reading; and
asserting said heater control signal.

29. The hard disk drive using said embedded circuit of claim 22, comprising:
said temperature sensor and said humidity sensor sensor-coupled to said embedded circuit; and
said embedded circuit coupled to said head stack assembly to provide said heating control to said intake heater to heat said air passing between said front edge of said slider and said rotating disk surface.

30. The hard disk drive of claim 29, wherein said head stack assembly includes said means for asserting said heater control signal to create said heating control provided to said intake heater.

31. A method of manufacturing said hard disk drive of claim 29, comprising the steps:
sensor-coupling said temperature sensor and said humidity sensor with said embedded circuit to create said temperature sensor and said humidity sensor sensor-coupled to said embedded circuit;
coupling said embedded circuit to said head stack assembly for providing said heating control to create said hard disk drive.

32. The hard disk drive as a product of the process of claim 31.

* * * * *